United States Patent
Detweiler et al.

(10) Patent No.: US 6,892,066 B2
(45) Date of Patent: May 10, 2005

(54) METHOD, APPARATUS, AND COMPUTER PROGRAM PRODUCT FOR AN ASSISTANCE TRANSPONDER

(75) Inventors: Keely RaNae Detweiler, Austin, TX (US); Samuel Roy Detweiler, Austin, TX (US); Helen S. Hall, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 10/112,478

(22) Filed: Mar. 28, 2002

(65) Prior Publication Data

US 2004/0203349 A1 Oct. 14, 2004

(51) Int. Cl.[7] .......................... H04M 3/42; H04B 5/00; H04Q 7/20
(52) U.S. Cl. ............................. 455/414.4; 455/414.1; 455/41.2; 455/456.3
(58) Field of Search ........................ 455/404.1, 404.2, 455/414.1, 415, 456.1, 456.2, 456.3, 41.2, 41.1

(56) References Cited

U.S. PATENT DOCUMENTS

| | | | | |
|---|---|---|---|---|
| 5,835,861 A | * | 11/1998 | Whiteside | 455/466 |
| 5,848,129 A | * | 12/1998 | Baker | 379/67.1 |
| 6,219,696 B1 | * | 4/2001 | Wynblatt et al. | 709/218 |
| 6,253,069 B1 | * | 6/2001 | Mankovitz | 455/186.1 |
| 2002/0094787 A1 | * | 7/2002 | Avnet et al. | 455/68 |
| 2003/0073461 A1 | * | 4/2003 | Sinclair | 455/557 |
| 2003/0119447 A1 | * | 6/2003 | Fisher et al. | 455/41 |
| 2003/0148796 A1 | * | 8/2003 | Bermel | 455/566 |
| 2004/0033795 A1 | * | 2/2004 | Walsh et al. | 455/404.1 |

* cited by examiner

*Primary Examiner*—Vivian Chin
*Assistant Examiner*—Raymond B. Persino
(74) *Attorney, Agent, or Firm*—Diana Roberts-Gerhardt; Anthony V S England

(57) ABSTRACT

In a method for providing customized services to a person having a disability, a first message is transmitted by a wireless client device and is received by a server device. The client device is operable by the person with the disability. The first message is transmitted by using a close-range, standard-protocol radio signal. The server device sends a first response message to the client device by using the protocol. The first response identifies a contact phone number. The person with disability dials the contact phone number, thereby generating a second message that uniquely identifies the person. The server device receives the second message on the wireless carrier network. The server device performs a search on a database for a record matching the person. On finding a match, a second response is sent to the client device describing a list of customized services configured for the person with disabilities.

32 Claims, 5 Drawing Sheets

METHOD, APPARATUS, AND COMPUTER PROGRAM PRODUCT FOR AN ASSISTANCE TRANSPONDER

BACKGROUND OF THE INVENTION

1. Field of the Invention

The present invention relates to wireless devices, and more particularly relates to a wireless device equipped to provide customized assistance to a user.

2. Related Art

Use of computer technology to assist persons with disabilities to improve their quality of life is well known. For example, a computer based navigational system equipped with a global positioning satellite ("GPS") input provides assistance to a blind person to safely navigate from home to place of work.

Persons with mobility needs such as persons using a wheelchair generally have difficulty maneuvering around obstacles such as large doors or steps. Unfortunately, availability of assistance to maneuver around these obstacles may be limited due to a lack of information available to persons with mobility needs and/or a lack of communication between a requester and a provider of special service for persons with disabilities. Some solutions have resulted in the installation of automatic door openers and ramps at main entrances. However, it would be generally expensive to make all doors capable of being opened automatically or by a push-button. Therefore, a need exists to improve communication between a requester and a provider of special service for persons with disabilities.

SUMMARY

The forgeoing need is addressed by the present invention. According to one form of the invention, in a method for providing customized services to a person having a disability, a first message is transmitted by a wireless client device and is received by a server device. In one form, the wireless device is a wireless phone or similar portable device, such as a personal digital assistant, having telecommunications circuitry operable to communicate on a wireless carrier system and/or on a close-range, standard-protocol radio signal. The client device is operable by the person with the disability. The first message is transmitted by using the close-range, standard-protocol radio signal. The server device sends a first response message to the client device by using the standard-protocol. The first response identifies a contact phone number. The person with disability dials the contact phone number, thereby generating a second message that uniquely identifies the person. The server device receives the second message on the wireless carrier network. The server device performs a search on a database for a record matching the person with the disabilities. On finding a match, a second response is sent to the client device describing a list of customized services configured for the person with disabilities.

In another aspect, the wireless device includes a GPS. The GPS is used to determine the position of the person with the disabilities. Determining the position may allow further customization of services available to the person with disabilities.

Other advantages of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

Figure 1:
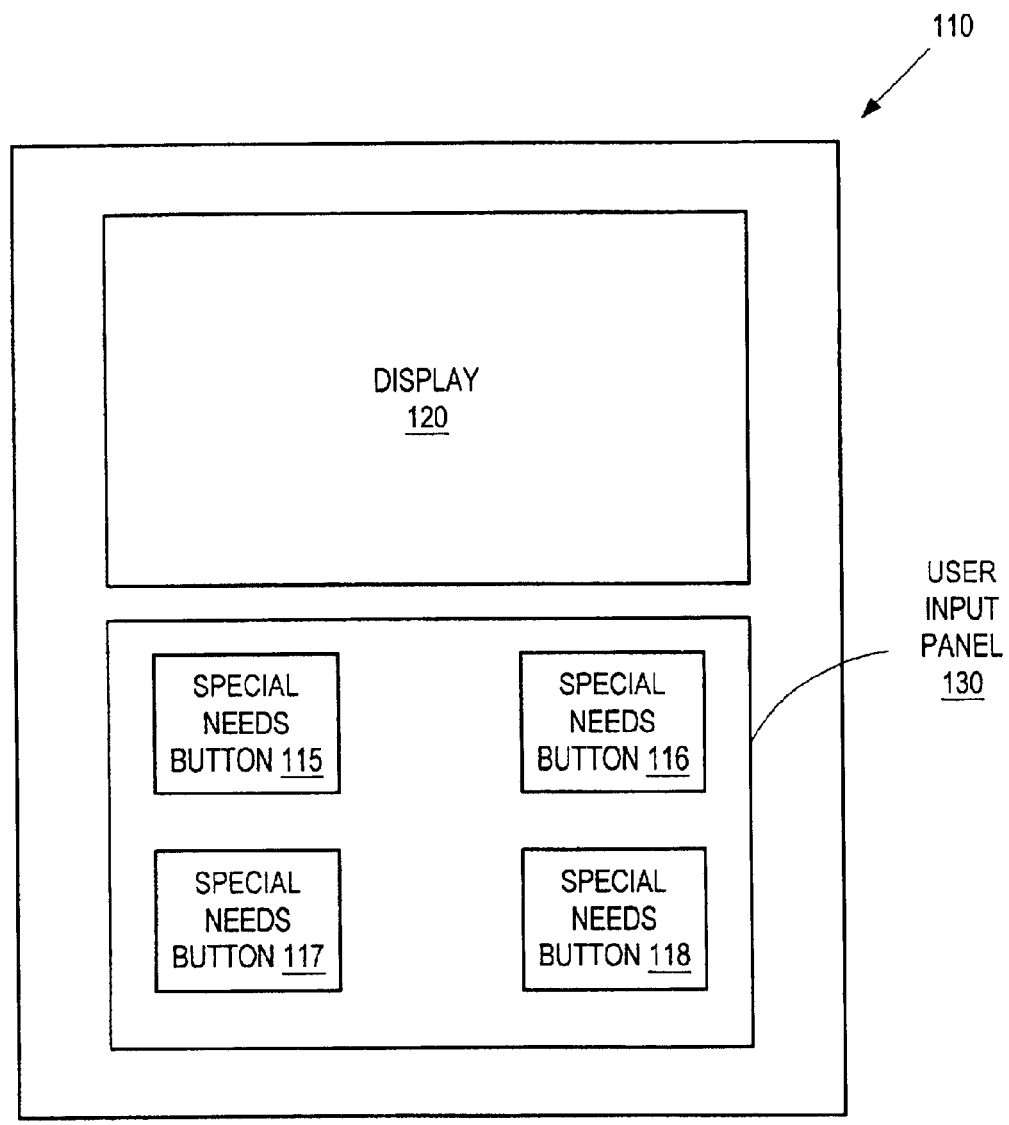
FIG. 1 illustrates a wireless device equipped with at least one special needs button, according to an embodiment of the invention.

FIG. 1 illustrates a wireless device 110 equipped with at least one special needs button 115 according to an embodiment of the invention. Three additional special needs buttons 116–118 are illustrated according to an embodiment of the invention, each special needs button being configurable to request a particular special need of a person with disability. A display screen 120 is used to display text and/or graphic information. User input devices such as the special needs button 115 or keyboard, not shown, are grouped under a user input panel 130.

Figure 2:
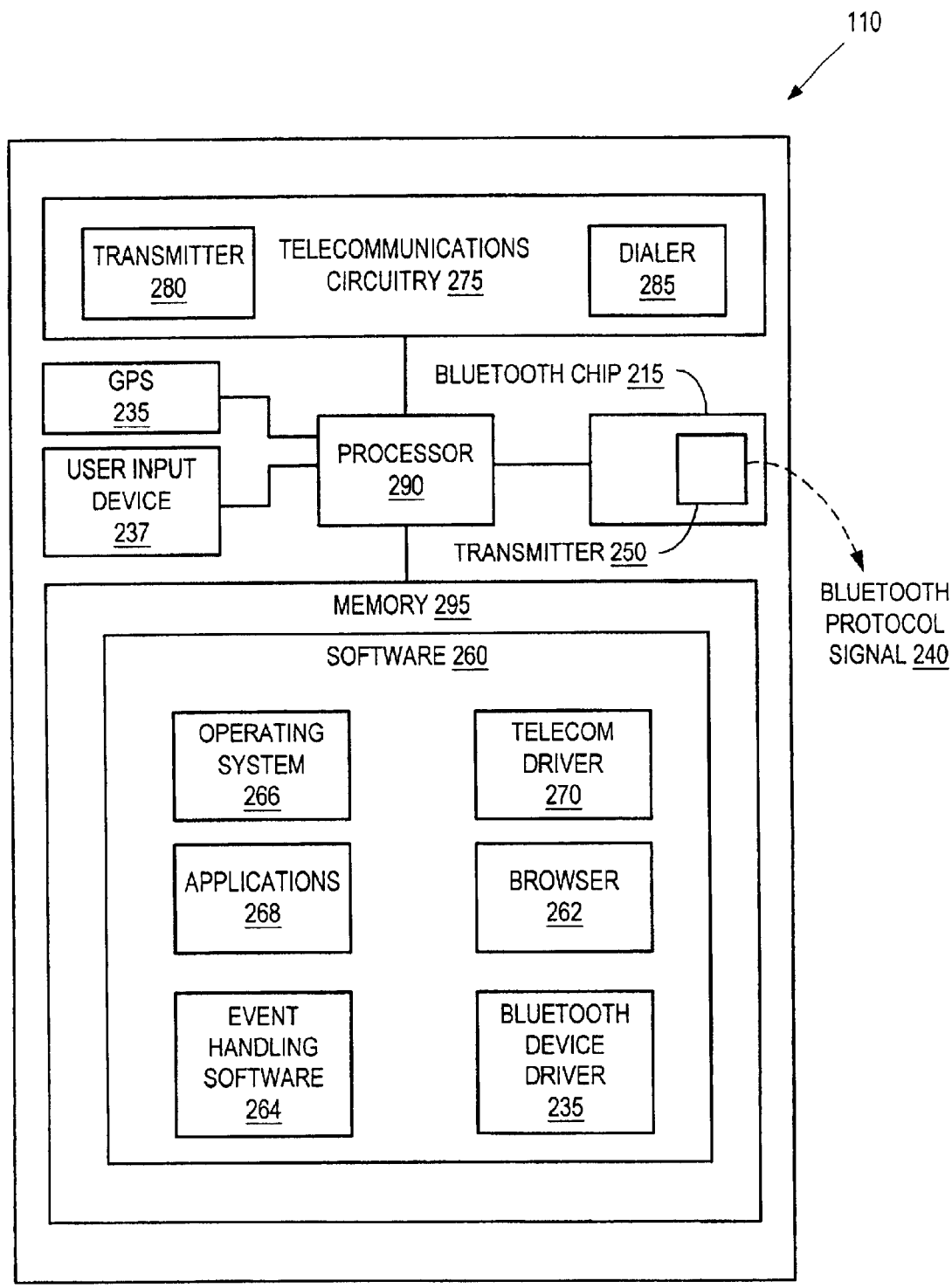
FIG. 2 illustrates more details of wireless device, and additional aspects of an embodiment of the invention.

FIG. 2 shows more details of FIG. 1, and additional aspects of an embodiment of the invention. The wireless device 110 includes telecommunications circuitry 275 having a dialer 285, e.g., a multi-frequency tone generator, for dialing phone numbers. The circuitry 275 also has a transmitter 280 for sending voice and data signals. The circuitry 275 also has a receiver, not shown, for receiving messages. The circuitry 275 is coupled to a processor 290, and the processor 290 is coupled to a memory 295 in which software 260 is stored, including special needs button 115 software 264, which has an operating system 266 and various applications 268. User input device 237 coupled to processor 290 collects user inputs from the user input panel 125, including the activation of the special needs button 115. The software 260 also includes a telecommunication circuitry driver 270 and a browser 262. The wireless device 110 is operable to transmit a Bluetooth-protocol radio signal notification 240 of the event responsive to the activation of the special needs button 115. The radio signal notification signal 240 may be received by other devices, e.g., a Bluetooth master device.

Bluetooth is a well-known technology standard using short-range radio links, and is intended to replace cable(s) connecting portable and/or fixed electronic devices. The Bluetooth standard, promulgated by the Bluetooth Special Interest Group (SIG), defines a uniform structure for a wide range of devices to communicate with each other. The Bluetooth technology also offers wireless access to local area networks ("LAN"), telephone networks, the mobile phone network, computer networks and the Internet. The Bluetooth wireless communication protocol uses the 2.4 gigahertz industrial, scientific, and medical band ("ISM band") for close-range radio communication between various Bluetooth-enabled devices.

In related terminology, the term "close-range, standard-protocol network" is used herein to refer to a network formed by devices communicating at close-range, i.e., typically no more than 100 feet distant, using such a close-range, standard-protocol radio signal.

The wireless device 110 includes a radio transmitter 235, which is part of a Bluetooth chip 210. In this embodiment, the wireless device 110 memory 295 stores software 260 that includes event handling software 264 to detect the activation of the special needs button 115. The processor 290 is operative with the software 260 to initiate the Bluetooth-protocol radio signal notification 240 by the radio transmitter 235 responsive to the activation of the special needs button 115.

The wireless device 110 is capable of sending/receiving voice and/or data signals. Data may be displayed on the display screen 120 or through an audio device such as a speaker (not shown). The memory 295 is also operable for storing data such as personal information including passwords, names of assistance providers, telephone numbers, hours of operation for a business, e-mail addresses for routing the message 240 to the receiving device.

Figure 3:
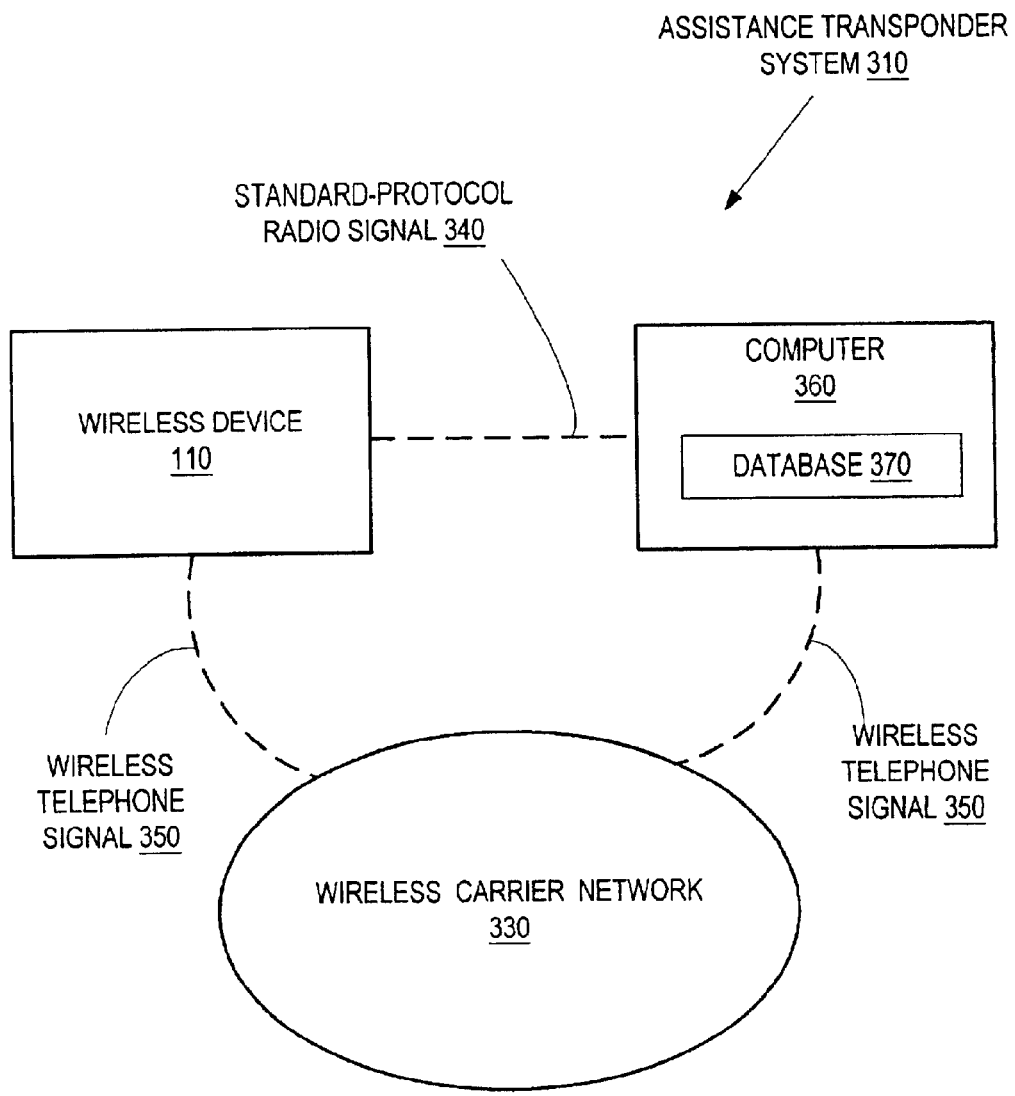
FIG. 3 illustrates a block diagram of an assistance transponder system, according to an embodiment of the invention.

FIG. 3 illustrates a block diagram of an assistance transponder system 300. In one embodiment, the assistance transponder system is implemented using client/server architecture coupled by a communications network. In this embodiment, a client device, e.g., the wireless device 110, is coupled to a server device. The server device, e.g., a computer 360, is capable of providing information describing special services available to a person with disabilities. The server device is also capable of communicating with other client devices similar to the wireless device 100. The computer 360 is coupled to a database 370. The wireless device and the computer 360 are also coupled to a wireless carrier network 330. According to the embodiment, the wireless device 110 is configurable to communicate with the computer 360 using a standard-protocol radio signal 340 such as the Bluetooth wireless communication protocol.

In another embodiment, the assistance transponder system is implemented using a master/slave architecture coupled by a communications network. In this embodiment, a slave device, e.g., the wireless device 110, is coupled to a master device, e.g., the computer 360. The master device is capable of providing information describing special services available to a person with disabilities.

The term "wireless carrier network" 330 refers to a cellular phone system, such as a system according to the GSM standard in the 900 MHz band, which is now pervasive in developed countries, and permits calling among both wired and cellular phones. It also includes a phone system of similar functionality, but of the satellite type, such as Globalstar. (Globalstar is a trademark of Loral QUAL-COMM Satellite Services.)

The database 370 includes information describing special services available to a person with disabilities. Each person with disabilities may provide input to configure the database 370. For example, the person with disabilities may describe the nature of their disability, e.g., hearing impaired, vision impaired, or needing a wheelchair. The database 370 stores customized services corresponding to each unique person with disabilities. The database 370 may be shared and be universally accessible by all businesses or organizations for providing customized services to each person with disability. The database 370 is protected against unauthorized changes by appropriate security techniques such as use of hardware keys, passwords, and unique caller identifiers.

In this embodiment, the wireless device 110 and the computer 360 are also configured to communicate with each other through the wireless carrier network 330, such as a cellular telephone network.

In one embodiment, the wireless device 110 includes a GPS 335 system that automatically determines the position and/or location of the user. The position information may be communicated to the computer 360 by using Bluetooth and/or telephone networks.

Figure 4:
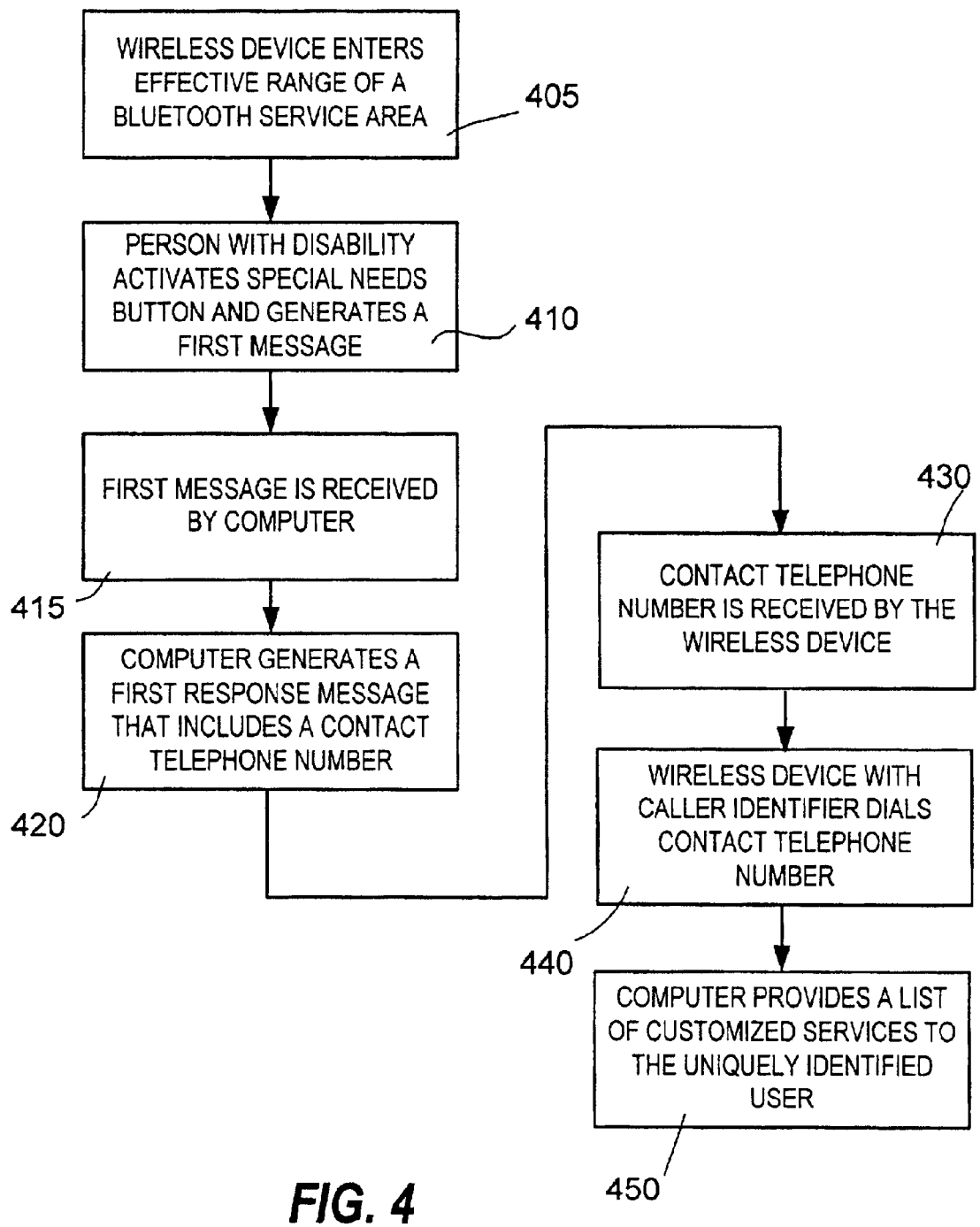
FIG. 4 illustrates method steps for providing customized services to a person having a disability, according to an embodiment of the invention.

Referring now to FIG. 4, a method of providing customized services to a person having a disability is illustrated, according to an embodiment of the invention, beginning at 405. A user of the wireless device 110, e.g., a person with disabilities, enters an area such as an office building and determines that additional assistance and/or information is needed, e.g., to maneuver around obstacles. The office building is equipped with the computer 360 that is capable of providing information describing special services available to the person with disabilities. The computer 360 is capable of communicating with other devices using wireless communications technology such as Bluetooth, or cellular telephone networks. In one embodiment, the computer 360 automatically detects the presence of the wireless device 110 when the wireless device 110 enters the effective range of the Bluetooth communication system included in the computer 360. The effective range may vary depending on the specific close-range, standard-protocol radio signal used.

In order to obtain additional assistance and/or information, the person with disabilities activates the special needs button 115, at 410. The software 264 detects the activation of the special needs button 115. This initiates sending a first message from the wireless device 110 to computer 360 using the close-range, standard-protocol radio signal, e.g., the Bluetooth-protocol radio signal. The first message includes information that indicates a request for special services. In one embodiment, the first message may include information describing a position or location of a user of the wireless device as determined by the GPS 335. The first message is received by the computer 360, at 415. In response, a first response message is prepared and transmitted by the computer 360, at 420 using the close range, standard-protocol radio signal. The first response message identifies a contact telephone phone number for obtaining additional assistance and/or information for persons with disabilities. In one embodiment, the contact phone number provided may be closest to the location of the user, the location being determined by the GPS 335. The contact phone number is formated for visual display on the wireless device 110, such as in HTML format, in one embodiment. In another the phone number is sent in a format for audible transmission on a speaker of the wireless device 110. The first response message is received by the wireless device 110, at 430. In one embodiment, the display screen 120 is used to display the contact telephone number. In another embodiment, the contact telephone number may be output as an audio message. In yet another embodiment, the wireless device 110 is programmed to autodial the contact phone number when received.

The user of the wireless device 110, e.g., a person with disabilities, dials the contact number, at 440, thereby generating a second message. The second message may include additional information uniquely identifying the user of the wireless device. Technology to uniquely identify a user may include for example, use of a caller identifier, a hardware key identifier unique to the wireless device 110, or a user password stored in memory 295. The wireless carrier network 230 receives the second message and routes it to the computer 360. The computer 360 receives the second message from the wireless carrier network 230.

In response to receiving the second message, the computer 360 performs a search of the database 370 to find a database record matching the caller identifier. If a matching database record is not found, then a general list of services available to all persons may be sent to the wireless device 110. If a matching database record is found, a list of customized services is prepared corresponding to the uniquely identified user. A second response that describes the list of customized services is sent to the wireless device 110, at 450. For example, the database 370 may identify the user to be a hearing impaired person. Additional customization of services such as directing all information to be displayed on the display screen 120 for a hearing impaired user or locating the nearest automatic door, for a person using a wheelchair, based on GPS 335 input may also be possible.

Figure 5:
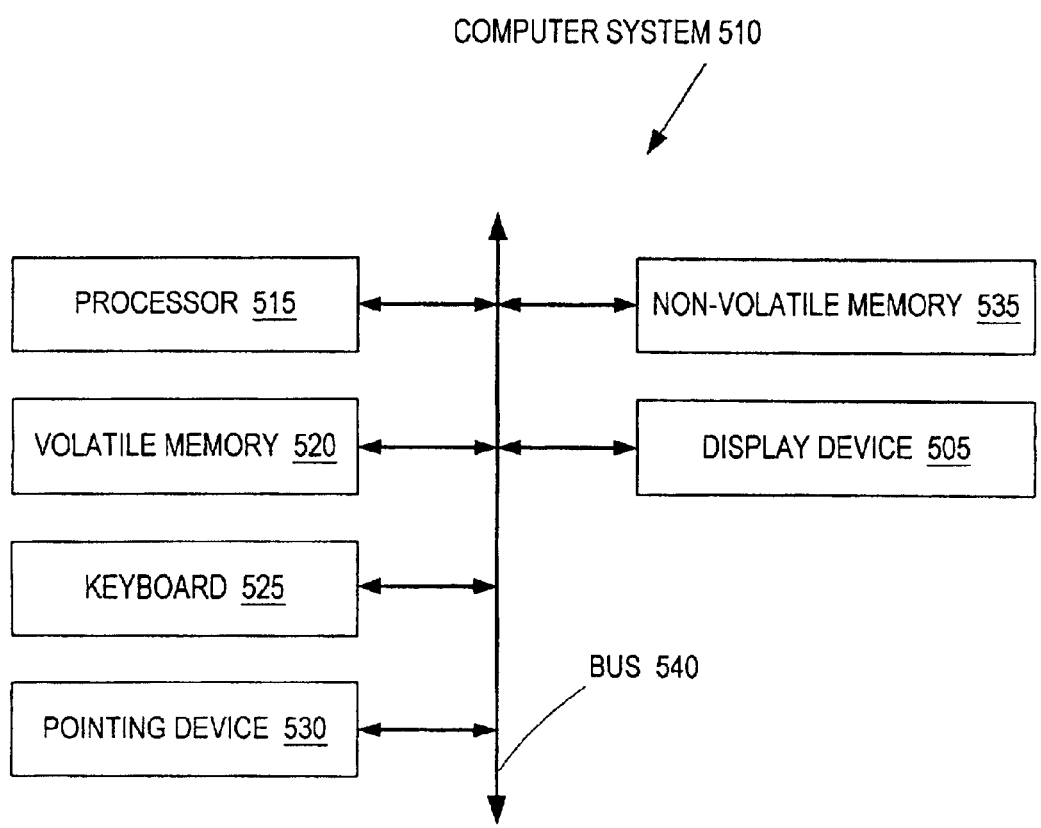
FIG. 5 illustrates a block diagram of a computer system to implement method or apparatus aspects of the present invention, according to an embodiment of the invention.

Referring now to FIG. 5, a computer system 510 is shown that is generally applicable for the various embodiments described, including the embodiment of computer system 360 (FIG. 3). The system 510 includes a processor 515, a volatile memory 520, e.g., RAM, a keyboard 525, a pointing device 530, e.g., a mouse, a nonvolatile memory 535, e.g., ROM, hard disk, floppy disk, CD-ROM, and DVD, and a display device 505 having a display screen. Memory 520 and 535 are for storing program instructions which are executable by processor 515 to implement various embodiments of a method in accordance with the present invention. Components included in system 510 are interconnected by bus 540. A communications device (not shown) may also be connected to bus 540 to enable information exchange between system 510 and other devices. The communications device may include telecommunications circuitry 275 and/or Bluetooth chip 215.

In various embodiments system 510 takes a variety of forms, including a personal computer system, mainframe computer system, workstation, Internet appliance, PDA, an embedded processor with memory, etc. That is, it should be understood that the term "computer system" is intended to encompass any device having a processor that executes instructions from a memory medium. Thus, the computer system 510 may be in the form of the wireless device 110 and/or the computer 360.

The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

The description of the present embodiment has been presented for purposes of illustration, but is not intended to be exhaustive or to limit the invention to the form disclosed. Many modifications and variations will be apparent to those of ordinary skill in the art. To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Those of ordinary skill in the art will appreciate that the hardware and methods illustrated herein may vary depending on the implementation. For example, it should be understood that while the Bluetooth wireless communications protocol is used for the short-range radio communications protocol of the present invention, it would be within the spirit and scope of the invention to encompass an embodiment using another protocol, such as IEEE 802.11. For example, the wireless device 110 of the described embodiment may be a cellular telephone or a personal digital assistant capable of communicating with other computers and/or telephones. Other devices, such multiple processors and memory devices and the like, may be used in addition to or in place of the hardware depicted. The depicted example is not meant to imply architectural limitations with respect to the present invention.

Additionally, it is important to note that while the present invention has been described in the context of a portable wireless device having a processor and memory, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

In another example, in other embodiments a message sent by the wireless device may be initiated by means other than a dedicated special needs button on the device. In one embodiment the message is initiated by a voice command. In another, a sequence of numbers on a keypad of the device is programed to initiate a message.

To reiterate, many additional aspects, modifications and variations are also contemplated and are intended to be encompassed within the scope of the following claims. Moreover, it should be understood that in the following claims actions are not necessarily performed in the particular sequence in which they are set out.

What is claimed is:

1. A method of providing customized services to a person having a disability, the method comprising:

receiving a first message transmitted by a client device, the client device being operable by the person with the disability, the first message being transmitted by a close-range, standard-protocol radio signal from a physical location;

sending a first response message to the client device, the first response being transmitted by the close-range, standard-protocol radio signal, wherein the first response identifies a contact phone number;

receiving on a wireless carrier network, a second message including a caller identifier to uniquely identify the person with the disability;

searching a database for a record matching the caller identifier, wherein the matching record indicates a physical disability of the caller and wherein the database stores customized services corresponding to the person with the disability and to the physical location; and sending a second response to the client device, wherein the second response is in a format responsive to the indicated physical disability of the caller and identifies the customized services for the physical location.

2. The method of claim 1, wherein the close-range, standard-protocol radio signal is based on a Bluetooth wireless network communications standard.

3. The method of claim 1 comprising the person with the disability selecting at least one customized service.

4. The method of claim 1, wherein the first message includes a position of the client device, the position being identified by a global positioning system included in the client device.

5. The method of claim 4, wherein the contact phone number identified is specific to the position of the client device.

6. The method of claim 4, wherein the second response comprises information further customizing the customized services in response to the position.

7. The method of claim 1, wherein at least one of the responses sent to the client device includes assistance information formatted for visual display on the client device.

8. The method of claim 1, wherein at least one of the responses sent to the client device includes assistance information formatted for audible transmission on the client device.

9. A wireless device operable to provide customized services to a person having a disability, the wireless device comprising:
   telecommunications circuitry operable to communicate on a wireless carrier network;
   close-range communications circuitry capable of communicating by a standard-protocol;
   user input circuitry operable to receive an input from a special needs button; and
   a processor coupled to the telecommunications circuitry, the close-range circuitry and the user input circuitry, wherein the processor is operable for:
      sending a first message in response to the person having the disability activating the special needs button, the first message being transmitted by the close-range circuitry from a physical location;
      receive a first response message, the first response being received by the close-range circuitry, wherein the first response identifies a contact phone number;
      dial the contact phone number on the wireless carrier network, wherein the telecommunications circuitry dials the contact phone number, wherein the wireless device is uniquely identified by a caller identifier;
      receive information describing customized services corresponding to the disability and to the physical location in response to dialing the contact phone number; and
      presenting the received information to the caller in a format responsive to the indicated disability of the caller.

10. The wireless device of claim 9, wherein the standard-protocol radio signal is based on a Bluetooth wireless network communications standard.

11. The wireless device of claim 9 comprising the person with the disability selecting at least one customized service.

12. The wireless device of claim 9 comprising a global positioning system to identify a position of the wireless device, wherein the first message includes the position.

13. The wireless device of claim 12, wherein the contact phone number identified is specific to the position.

14. The wireless device of claim 12, wherein the second response comprises information further customizing the customized services in response to the position.

15. The wireless device of claim 9, wherein at least one of the responses sent to the wireless device includes assistance information formatted for visual display on the client device.

16. The wireless device of claim 9, wherein at least one of the responses sent to the wireless device includes assistance information formatted for audible transmission.

17. A computer system for providing customized services to a person having a disability, the computer system comprising:
   telecommunications circuitry operable to communicate on a wireless carrier network;
   close-range communications circuitry capable of communicating by a standard-protocol; and
   a processor coupled to the telecommunications circuitry, and the close-range circuitry, wherein the processor is operable for:
      receiving a first message transmitted by a client device, the client device being operable by the person having the disability, the first message being transmitted by a close-range communications circuitry from a physical location;
      sending a first response message to the client device, the first response being transmitted by the close-range communications circuitry, wherein the first response identifies a contact phone number;
      receiving on the wireless carrier network a second message, wherein the second message is received by the telecommunications circuitry, wherein the second message includes a caller identifier to uniquely identity the client device;
      searching a database coupled to the processor for a record matching the caller identifier, wherein the matching record indicates a physical disability of the caller and wherein the database stores customized services corresponding to the person having the disability and to the physical location; and
      sending a second response to the client device, wherein the second response is in a format responsive to the indicated physical disability of the caller and identifies the customized services for the physical location.

18. The computer system of claim 17, wherein the standard-protocol radio signal is based on a Bluetooth wireless network communications standard.

19. The computer system of claim 17 comprising the person with the disability selecting at least one customized service.

20. The computer system of claim 17, wherein the first message includes a position of the client device, the position being identified by a global positioning system included in the client device.

21. The computer system of claim 20, wherein the contact phone number identified is specific to the position of the client device.

22. The computer system of claim 20, wherein the second response comprises information further customizing the customized services in response to the position.

23. The computer system of claim 17, wherein at least one of the responses sent to the wireless device includes assistance information formatted for visual display on the client device.

24. The computer system of claim 17, wherein at least one of the responses sent to the client device includes assistance information formatted for audible transmission on the client device.

25. A computer program product for an assistance transponder system, the assistance transponder system including a client device coupled to a server device, wherein the computer program product resides on a computer usable medium having computer readable program code and the assistance transponder system is operable to provide customized services to a person having a disability, the computer program product comprising:

instructions for receiving a first message transmitted by the client device, the client device being operable by the person with the disability, the first message being transmitted by a close-range, standard-protocol radio signal from a physical location;

instructions for sending a first response message to the client device, the first response being transmitted by the close-range, standard-protocol radio signal, wherein the first response identifies a contact phone number;

instructions for receiving on a wireless carrier network, a second message including a caller identifier to uniquely identify the person with the disability;

instructions for searching a database coupled to the server device for a record matching the caller identifier, wherein the matching record indicates a physical disability of the caller and wherein the database stores customized services corresponding to the person with the disability and to the physical location; and instructions for sending a second response to the client device, wherein the second response is in a format responsive to the indicated physical disability of the caller and identifies the customized services for the physical location.

26. The computer program product of claim 25, wherein the close-range, standard-protocol radio signal is based on a Bluetooth wireless network communications standard.

27. The computer program product of claim 25 comprising the person with the disability selecting at least one customized service.

28. The computer program product of claim 25, wherein the first message includes a position of the client device, the position being identified by a global positioning system included in the client device.

29. The computer program product of claim 28, wherein the contact phone number identified is specific to the position of the client device.

30. The computer program product of claim 28, wherein the second response comprises information further customizing the customized services in response to the position.

31. The computer program product of claim 25, wherein at least one of the responses sent to the wireless device includes assistance information formatted for visual display on the client device.

32. The computer program product of claim 25, wherein at least one of the responses sent to the client device includes assistance information formatted for audible transmission on the client device.

* * * * *